Oct. 1, 1963 H. G. LEUPOLD ETAL 3,105,638
TEMPERATURE CONTROLLERS AND RECORDERS
Filed April 26, 1961
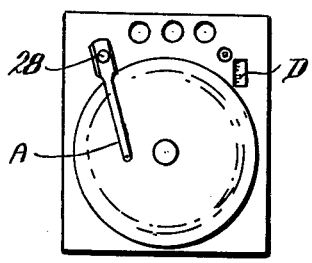
Fig. 1
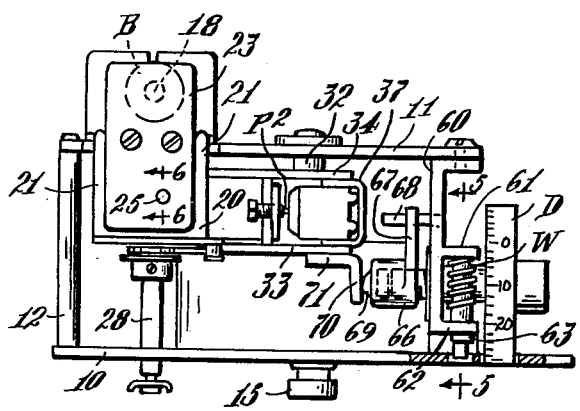
Fig. 3
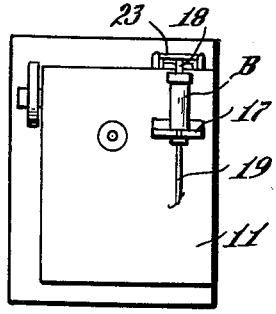
Fig. 4
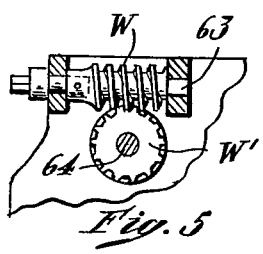
Fig. 5
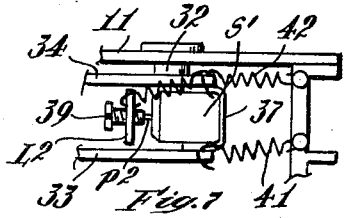
Fig. 6
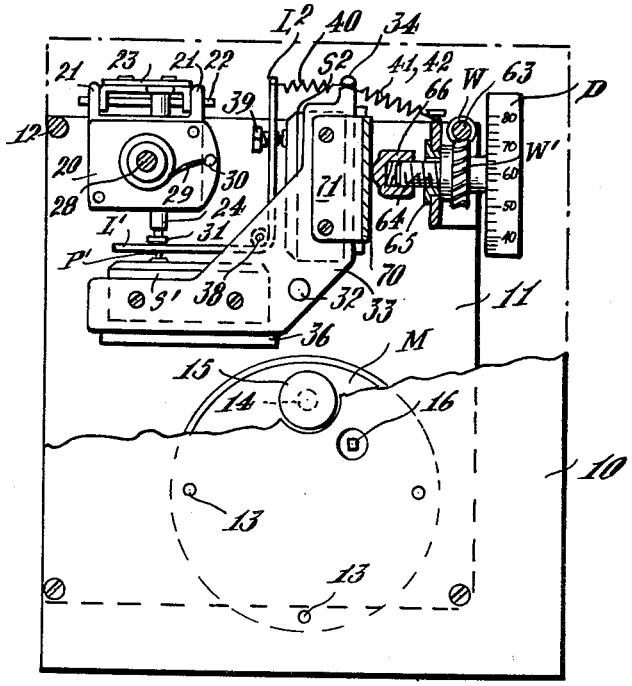
Fig. 2
Fig. 7
Inventors
Henry G. Leupold
Nicholas I. De Meo
by Roberts Cushman & Grover
Att'ys

United States Patent Office 3,105,638
Patented Oct. 1, 1963

3,105,638
TEMPERATURE CONTROLLERS AND RECORDERS
Henry G. Leupold, Arlington, and Nicholas L. De Meo, Medford, Mass., assignors to United Electric Controls Company, Watertown, Mass., a corporation of Massachusetts
Filed Apr. 26, 1961, Ser. No. 105,772
4 Claims. (Cl. 236—94)

This invention pertains to temperature controllers and recorders, in particular, apparatus which functions as a thermostat so as automatically to maintain a substantially constant temperature within a predetrmined space, for example for the control of a heating or cooling unit, and including means for making a permanent record of temperature variations in said space, for example, by the relative motion of a marking stylus and a record chart.

Temperature recording and controlling devices are well-known and in general use, but devices of this type, as heretofore constructed, are not altogether reliable when exposed to certain conditions of use, in particular, in situations such that the device is subjected to vibration or shock. For specific example, when a controlling and recording device of customary prior construction (comprising manually-actuatable means whereby the temperature to be maintained may be adjusted) is installed in a refrigerator truck and exposed to the almost constant vibration incident to such use, it has been found difficult to prevent the means for adjusting the temperature from slowly changing its position as the result of usual vibrations, or from suddenly changing its position as the result of violent shock, for instance, as occasioned by the heavy application of brakes, or minor collisions.

A principal object of the present invention is to provide a controller and/or recorder comprising manually actuatable means for setting the instrument to maintain the temperature within a compartment, for instance the refrigerating compartment of a truck, at a predetermined level, and which is so devised that the adjusting means will not be displaced as the result of vibration or shock. A further object is to provide a device of this type which is simple in construction and so rugged that exposure to constant vibration will not result in rapid deterioration of its constituent parts, or their failure to function in the intended manner. A further object is to provide a device of the type which is easily adjusted to the desired temperature, but wherein such adjustment requires the use of a key, thereby lessening the probability of tampering by unauthorized persons. A further object is to provide apparatus of this type, so devised as to actuate a signal or alarm in the event that, through some misfunctioning of the temperature changing unit, the temperature in the control space is not maintained within the predetermined range.

Other and further objects and advantages of the invention will be pointed out in the following more detailed description and by reference to the accompanying drawings wherein:

FIG. 1 is a diagrammatic front elevation to very small scale, showing the chart-supporting disc; the pen arm, and the graduated temperature indicator;

FIG. 2 is a front elevation, to larger scale than FIG. 1, omitting the chart-carrying disc and the pen arm, and with the front plate of the apparatus partially broken away to show the rear plate or chassis upon which the essential elements of the control apparatus are mounted—a portion of the control mechanism being in vertical section;

FIG. 3 is a plan view of the apparatus, as shown in FIG. 2, omitting certain parts;

FIG. 4 is a rear elevation of the apparatus, to the same scale as FIG. 1;

FIG. 5 is a fragmentary vertical section substantially on the line 5—5 of FIG. 3, showing the means whereby the graduated temperature-indicating part is adjusted;

FIG. 6 is a fragmentary vertical section, to larger scale, on the line 6—6 of FIG. 3; and FIG. 7 is a fragmentary plan view, to larger scale than FIG. 3, showing certain elements omitted from FIG. 3.

The present invention constitutes an improvement over the device disclosed in the copending application of Henry G. Leupold, Serial No. 19,714, filed April 4, 1960 and, more particularly, an improvement over that disclosed in the copending application of Henry G. Leupold, Serial No. 81,311, filed January 9, 1961, both applications being assigned to the assignee of the present invention. As herein disclosed, the apparatus comprises a front plate 10 and a rear plate or chassis 11, these plates being held in spaced parallel relation by four connecting posts, such as the post 12 shown in FIG. 3. The frame, thus constituted, may be mounted upon any suitable support or within any desired type of casing, but no attempt is here made to show such support or casing.

A motor M for driving a chart-carrying disc is secured to the rear side of the front plate 10 by screws 13 and has a shaft 14 which projects forwardly through a hole in the plate 10 and which is screw-threaded at its forward end for the reception of a clamping knob 15, by means of which a chart may be held in position to turn with the shaft. As here shown, this motor is a spring clock-motor having a winding staff 16 which is accessible, through a hole in the plate 10, for the application of a winding key. Obviously, an electric motor might be substituted for this spring motor if desired, providing a suitable source of electric current is available.

A shelf 17 (FIG. 4) is attached to the rear side of the chassis plate 11 and provides a support for a motor device B (FIG. 4) which may, for example, be of the kind more fully disclosed in the aforesaid copending application Serial No. 81,311 and comprising a metallic bellows (not here shown) having a movable upper head to which is secured a vertically movable pin 18, while, to the lower end of the bellows, there is attached one end of a capillary tube 19 which extends to a bulb or other container (not shown) arranged within the compartment whose temperature is to be regulated—such bulb, tube and bellows being filled with a fluid which has a high coefficient of temperature expansion, such that variations in the temperature of the bulb will cause substantial motion of the pin 18.

A metallic box 20 (FIG. 2) is secured to the forward face of the chassis plate 11 by screws or the like, and has projecting upwardly, from its top, spaced brackets 21 having openings in which are fixed the opposite ends, respectively, of a shaft 22, forming a fulcrum for a rigid lever member 23 (FIGS. 2, 3, 4 and 6), one end of which overlies the upper end of the vertically movable pin 18 of the motor device B. The upper and lower walls of the box 20 have aligned openings, preferably provided with guide bushings, for a vertically movable rigid rod or bar 24 (FIGS. 2 and 6), whose upper end underlies the forward arm of the lever 23. Preferably, this arm of the lever has an opening (FIG. 6) coaxial with the bar 24, and which loosely receives the stem portion 25 of a motion-transmitting stud 26, interposed between the upper end of the rod 24 and the underside of the lever 23. A thin steel washer 27 is desirably interposed between the lever 23 and the stud 26. The midportion of the rod or bar 24 is provided with rack teeth (not here shown) as illustrated in the above copending application, Serial No. 19,714, which mesh with a pinion (not shown) on a shaft 28 (FIGS. 2 and 3) which turns in bearings in the front and rear walls of the box 20. A clock spring 29 (FIG. 2) has its inner end fixed to this shaft and its outer end fixed to a pin 30 projecting from the forward wall of the box—this spring being so arranged that it tends to turn the shaft 28 in a counterclockwise rotation and thus to raise the rod or bar 24, so as to keep the stud 26 in contact with the forward arm of the lever 23. With this arrangement, upward motion of the pin 18 of the motor device B so rocks the lever 23 as to force the rod 24 downwardly, at the same time rotating the shaft 28. At its lower end, the rod 24 has a screw-threaded bore which receives the shank of an adjustable stud 31 which may be screwed in or out so as to change the effective length of the rod.

A rigid, horizontal fulcrum rod or staff 32 (FIG. 3) is fixedly secured at its rear end to the chassis plate 11, projecting forwardly from the latter, and this staff supports a rockable, switch-carrier frame comprising the parallel plates 33 and 34 (FIGS. 2 and 3). These plates are of substantially the same size and contour and are substantially L-shaped, with one arm horizontal and the other vertical. Between the horizotal arms of these plates there is arranged a switch $S^1$, which controls the supply of electrical energy to the motor of the temperature-changing apparatus, for example, a refrigerating machine. This switch, as shown is of conventional snap-action type, having the upwardly directed actuating pin $P^1$. Between the vertical arms of the plates 33 and 34, there is arranged a switch $S^2$ having the horizontally directed actuating pin $P^2$ (FIG. 3). This switch may control the supply of electrical energy to a signal device, for example, a buzzer, or a lamp located in the field of vision of an attendant. Desirably, a guard member (36) of U-shape in vertical section, is arranged below the casing of the switch $S^1$, with its upwardly directed legs interposed between the switch casing and the plates 33 and 34—this guard member providing a chamber between its lower wall and the underside of the switch for housing the lead wires (not here shown) of this switch. A similar guard 37 provides a housing for the conductors (as shown in the above application, Serial No. 81,311) for the switch $S^2$, the switches and the plates 33 and 34 being held in assembled relation by screws.

For coordinating the action of the two switches, there is provided a motion transmitter of L-shape comprising the horizontal arm $L^1$ and the vertical arm $L^2$, this device being pivotally mounted between the plates 33 and 34 by means of a pivot pin 38 located in the angle between the two arms. The arm $L^1$ lies directly above the actuating pin $P^1$ of the switch $S^1$, while the arm $L^2$ is provided with a threaded opening which receives an adjusting screw 39 whose tip is directly opposite to the end of the switch pin $P^2$. A tension spring 40 connected at one end to the arm $L^2$ and at its other end to the plate 34 tends to hold the adjusting screw 39 in contact with the pin $P^2$ with force sufficient to depress the pin of the switch $S^2$. Tension springs 41 and 42 (FIG. 7) are secured at their opposite ends to lugs projecting upwardly from the plates 33 and 34 respectively, and to a fixed part of the frame. These springs tend to swing the switch-carrying frame in a clockwise direction about the supporting staff 32.

A bracket 60 (FIG. 3) is fixed to the chassis plate 11 and projects forwardly toward the front plate 10. This bracket has two parallel arms 61 and 62 (FIG. 3), having aligned bearing openings for the reception of a worm shaft 63 having thereon a worm W located between the arms 61 and 62. At its forward end this shaft is squared for the reception of a clock key, whereby it may be turned manually. The worm W meshes with a worm wheel $W^1$ (FIGS. 2 and 5) which is fixed to a shaft 64 arranged to turn in a bearing 65 (FIG. 2) fixed in an opening in the bracket 60. The left-hand end of the shaft 64 (as seen in FIG. 2) is screw-threaded for engagement with a screw-threaded bore in a contact cap 66. This cap 66 is prevented from turning by having a rigid arm 67 (FIG. 3) parallel to the bracket 60 and which has an opening at its end having sliding engagement with a horizontal pin 68, fixed at one end in an opening in the bracket. The cap 66 has a tapering boss 69 at its left-hand end, as viewed in FIG. 3, which is adapted to contact a rigid abutment arm 70 (FIG. 2) projecting forwardly from a bracket 71 which is secured to the front plate 33 of the switch carrier.

At its right-hand end, as viewed in FIGS. 2 and 3, the worm wheel shaft has fixed thereto an indicator disc D, whose periphery is graduated to indicate degrees of temperature and provided with suitable numerals to assist in identifying selected graduations. The front plate 10 is provided with an opening (FIG. 1) through which a small portion of the graduated periphery of the disc D may be seen. The front plate is also provided with an opening (FIG. 3) which is aligned with the squared end of the worm shaft 63, so that a suitable key may be inserted through the opening for engagement with said squared end for turning the worm.

The screw thread on the left-hand end of the worm wheel shaft is of small pitch, so that a substantial rotation of the worm shaft results in but a slight axial motion of the contact cap 66. Since engagement of the boss 69 of this cap 66, with the bracket arm 70, determines the normal position of the switch carrier, it is manifest that the position of the switch carrier may be adjusted with great nicety by the concomitant employment of the worm and wheel and the low-pitch screw thread. Furthermore, this adjustment, involving the use of a worm and wheel, is of a type such as is not appreciably affected by vibrations or shock to which the instrument may be subjected.

The shaft 28, above referred to, projects forwardly through an opening in the front plate 10 and a pen arm A is secured to this forwardly projecting portion of the shaft and carries a pen or stylus of conventional type (not shown) operative to make a mark on a paper record disc secured by the clamping knob 15 to turn with the shaft 14. Since the shaft 28 is turned by the motor device B, in accordance with variations in the temperature in the controlled compartment, and since the record disc is turned at constant speed by the motor M, the pen draws upon the chart a line which accurately represents variations in temperature.

For convenience in description, it is assumed that the switch $S^1$ is so connected into the circuit of the motor of a refrigerating apparatus, that when the switch-actuating pin is free, the motor circuit is broken and the refrigerating apparatus is stopped, while the switch $S^2$ on the other hand, is so connected into a signal circuit that when the pin is free, the circuit is closed and a signal, for example a light or sounding device is energized, and that when the latter pin is depressed the circuit of the signalling means is open. Upon the basis of such assumption, and considering that the indicator D has been adjusted to a position requiring the maintenance in the cooling chamber of a temperature of 40°, then when this temperature has been attained in the controlled chamber, the bellows motor device B will have drawn the part 18 downwardly to a position such that the rod 24 will have risen sufficiently to have released the pin of the switch $S^1$, so that the circuit of the refrigerating motor is broken and the refrigerating apparatus is idle. It will be noted that the amount of motion of the part 24 necessary to free the pin of the switch depends upon the initial position of the switch pin as determined by the adjustment of the indicator D. If, now, the temperaure in the controlled space rise, the rod 24 will be moved downwardly again and eventually depress the switch pin thus closing the switch circuit and starting the motor of the refrigerating apparatus into action again. However, if, because of some failure of the refrigerating apparatus to start, or for any other reason, the temperature in the control space still continues to rise, the rod 24 will be moved farther down thus further depressing the switch pin (without effect on the motor circuit) and, at the same time, further depressing the horizontal arm L¹ of the motion transmitting device, so as to withdraw the vertical arm L² from the pin 33 of the switch S² and thus causing the signal circuit to be closed, and so giving notice that the apparatus is not functioning as intended.

Because of the connections (involving a worm and wheel drive) herein provided between the indicator D and the switch carrier, the adjustment of the switch carrier by the operation of the indicator wheel D is not changed by reason of vibration or shock to which the instrument may be subjected, so that the apparatus remains functionally operative and accurately maintains the desired temperature even though the device may be installed in a truck or other vehicle, or in any other situation where it is exposed to substantially constant vibration and even heavy shocks.

While one desirable embodiment of the invention has herein been disclosed by way of example, it is to be understood that the invention is broadly inclusive of any and all modifications falling within the scope of the appended claims.

We claim:

1. In control apparatus for automatically maintaining a predetermined temperature in the cold compartment of a refrigerating vehicle and which is of the kind which comprises a switch for installation in the supply circuit of the motor for the cooling apparatus, a thermally-responsive motor device for actuating the switch to close or open said circuit, and means whereby the apparatus may be adjusted so that the switch will respond to different selected temperatures, said adjusting means comprising a movable support for the switch, the combination, with said movable support of a worm shaft and a worm thereon, manually-actuable means for turning the worm shaft, a shaft carrying a worm wheel which meshes with the worm, a graduated dial fixed to one end of the worm wheel shaft, the opposite end portion of the worm wheel shaft being screw-threaded, and a contact element having threaded engagement with the threaded portion of said worm wheel shaft, the switch support having a part with which said contact element engages, and spring means urging said part toward the contact element.

2. In temperature-control apparatus of the kind wherein a snap-action switch comprising a slidable operating pin is arranged to control the supply of electrical energy to apparatus by means of which the temperature, within a compartment, may be varied, an actuating element engageable with the switch pin for moving the latter, a motor device operative in response to variations in temperature in said compartment to move the pin actuating element, a movable carrier for the switch, whereby the normal distance between the switch pin and said actuating element may be adjusted, and means for adjusting the switch carrier, the actuator for moving the switch pin being a slidable rod which is approximately coaxial with the switch pin, means for transmitting motion from the temperature-responsive motor device to said rod for moving the latter, a rotary shaft, means whereby motion of the rod causes the shaft to turn, the combination, with said shaft of a pen-supporting arm fixed to said shaft, a chart-supporting shaft, and means for driving the latter shaft at a uniform speed, and means for attaching a chart to said chart-supporting shaft for the reception of a mark made by a pen carried by the pen-supporting arm.

3. Apparatus according to claim 2, further characterized in that the instrument comprises a front plate, and the means for driving the chart-supporting shaft is a clock mechanism fixed to the rear side of said front plate, the front plate having an opening through which said shaft projects, the front plate also having an opening axially aligned with the worm shaft, and the latter having a squared end accessible through said opening for application of a key, whereby the worm shaft may be turned, the front plate also having a slot through which the graduated periphery of the index wheel is visible.

4. In temperature-control apparatus of the kind wherein a snap-action switch, comprising a slidable operating pin, is arranged to control the supply of electrical energy to apparatus by means of which the temperature within a compartment may be varied, an actuating element engageable with the switch pin for moving the latter, a motor device operative in response to variations in temperature in said compartment to move the pin-actuating element, a movable carrier for the switch, whereby the normal distance between the switch pin and the actuating element may be adjusted, the combination, with said carrier, of a fixed abutment and a movable contact element for limiting motion of said movable carrier in one direction, spring means yieldably urging the switch carrier toward said abutment, a worm wheel mounted on a shaft having a screw-threaded portion which engages an internally screw-threaded bore in said movable contact element, means operative to prevent said contact element from rotating with said shaft while permitting it to move axially of the shaft toward said fixed abutment, a worm wheel fixed to the shaft, a worm which engages the worm wheel, means whereby the worm may be turned manually, and an indicator disc fixed to the worm wheel shaft and provided with index graduations upon its peripheral edge.

References Cited in the file of this patent

UNITED STATES PATENTS

| | | |
|---|---|---|
| 1,375,780 | Khotinsky | Apr. 26, 1921 |
| 1,484,092 | Snediker | Feb. 19, 1924 |
| 1,629,710 | Klopsteg | May 24, 1927 |
| 2,289,882 | Myers | July 14, 1942 |
| 2,447,895 | Bauman | Aug. 24, 1948 |
| 2,755,682 | Boyd | July 24, 1956 |
| 2,896,476 | Williams | July 28, 1959 |
| 2,920,155 | Corcoran | Jan. 5, 1960 |

OTHER REFERENCES

German printed application 1,013,664, Aug. 14, 1957.